Feb. 3, 1959   R. L. STREBINGER   2,871,996
BRAKE SHOE
Filed June 20, 1955

INVENTOR.
ROBERT L. STREBINGER
BY John A. Young
ATTORNEY.

United States Patent Office 2,871,996
Patented Feb. 3, 1959

2,871,996

BRAKE SHOE

Robert L. Strebinger, South Bend, Ind., assignor to Bendix Aviation Corporation, South Bend, Ind., a corporation of Delaware Application June 20, 1955, Serial No. 516,707

6 Claims. (Cl. 188—250)

This invention relates to a brake shoe construction which may be used in an internally expanding brake.

One of the objections to brake shoes having lining adhesively attached to the rim, is the noise which accompanies a brake application. Several solutions have been proposed to this objectionable brake noise. Many of these solutions, such as wrapping springs around the brake drums, are adequate for preventing brake noise but they are also expensive and are therefore undesirable.

The primary object of the present invention is to obtain a more economical, a more simple, and a more effective way of eliminating noises incident to a brake application with shoes of the bonded lining type.

It is an object of the invention to condition the rim of the shoe so that it is movable. It will be seen that a very important principle of the invention is that the lining can flex with limited movement; I propose in this manner to eliminate brake noise.

Other objects and features of the invention will become apparent from a consideration of the following description which proceeds with reference to the accompanying drawings wherein.

Figure 1:
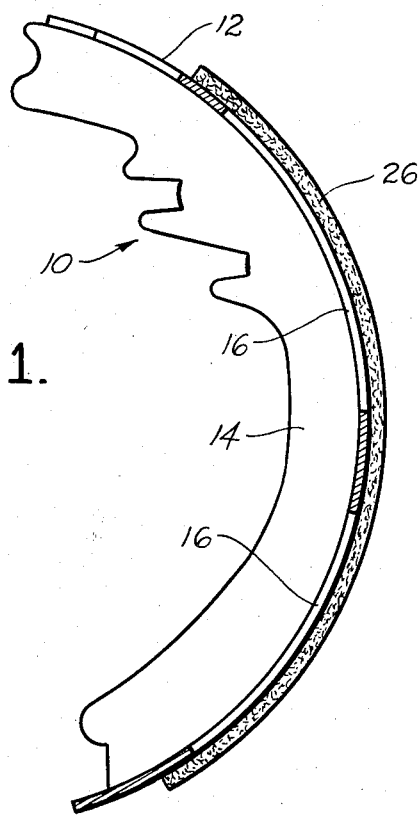
Figure 1 is a side view of a brake shoe.
Figure 2:
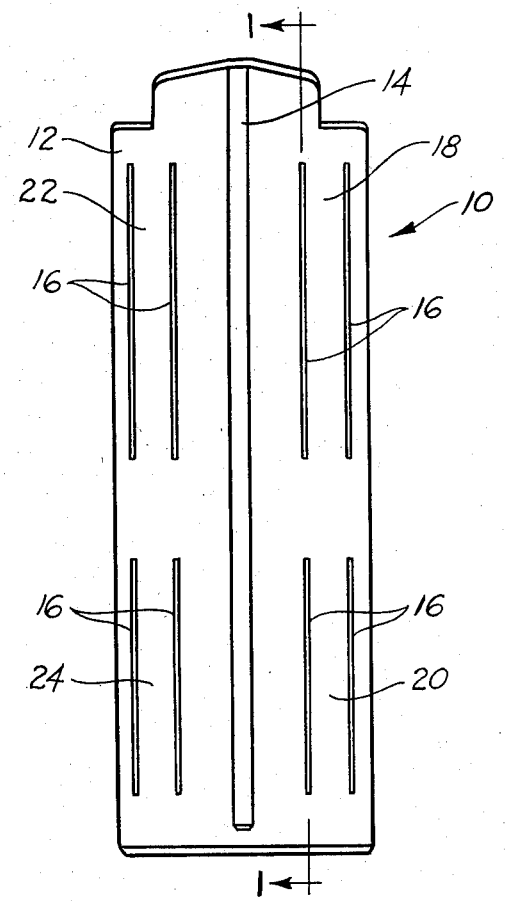
Figure 2 is an elevation view looking at the brake shoe from the left hand side of Figure 1.

Brake shoe 10 in Figures 1 and 2 includes an arcuate rim 12 and a transverse strengthening web 14 which is secured to the rim 12. As shown in Figure 2, a plurality of parallel cuts or slits 16 are made in the surface of the rim, four of these pairs of slits being shown. The slits 16 are formed in pairs and are parallel both to each other and to the edge of the rim. The slits form segments 18 and 20 on the right hand side of the web and segments 22 and 24 on the left hand side of the rim (Figure 2). Any suitable bonding material is coated on the outer surface of the rim in the regions between the slits 16.

The bonding material, which is coated between the slits in the respective segment, does not extend beyond the ends of the slits or cuts and preferably is not closer than about 1/4" to 1/8" to the end of the rim. Arcuate friction material 26 is placed over the outer surface of the rim 12 and is secured to the rim by means of the bonding material located at segments 18, 20, 22 and 24 respectively. The segments bounded by slits 16 are flexible and are depressed slightly from the outer surface of the rim (toward the left hand side of the rim looking at Figure 1). The purpose of depressing the segments is that when bonding material is coated thereon, the lining can be held tight against the remaining surface of the shoe rim. It will be noted that bonding cement is applied only to the portions of the rim 12 between the slits, that is, the flexible portion of the rim.

The result of providing flexible portions of the rim to which the lining is attached, enables a slight relative movement between the lining 26 and the rim 12. This relative movement between the lining 26 and rim 12 eliminates noises which would otherwise accompany a brake application.

The uncoated portion of the lining is in complete contact with the uncoated portion of the rim. The pressure of the lining against the drum, resulting from brake application, is brought to bear against the uncoated, rigid portion of the shoe. In this respect the brake shoe is operationally similar to a riveted lining construction wherein the riveted portion of the shoe deflects sufficiently to allow full bearing of the lining against the more rigid portion of the shoe.

In addition to the adhesive action of the bonding material, the lining is also held against circumferential movement (when it contacts the drum) by the friction between the uncoated part of the lining and rim. The static coefficient of friction between the lining and shoe rim, multiplied by the normal force of application between the lining and the drums, assists the bonding agent in holding the lining on the rim of the shoe.

The solution to the brake noise problem, by providing segmented areas bonding the lining, has not resulted in any sacrifice of strength for the brake shoe. Furthermore, the annoyance of brake squeals is ended at a substantially lower cost than various other proposed methods.

Although only a single selected embodiment of the invention has been disclosed, it will be apparent to those skilled in the art that various modifications can be made in practicing the invention to obtain the objects thereof. It is my intention to include these modifications which embody the underlying principles of the invention within the scope of the following claims.

I claim:

1. A brake shoe comprising a rim, a longitudinal strengthening web, a plurality of spaced slits in said rim on either side of said web, a bonding agent which is coated on the outer surface of the rim only between the slit portions of said rim, and a friction lining which is secured to the rim by said bonding agent, the slit portions of said rim being flexible to form segments permitting limited radial movement of the lining with respect to the general surface of the rim.

2. A brake shoe, comprising a web, an arcuate rim, and a plurality of lanced segments in said rim on either side of said web, the sides of said lanced segments being parallel to the edges of said rim, said segments being flexible so as to move in a plane parallel to the plane of said web, a bonding agent which is applied only over the outer surface of the flexible segments of said rim, and a friction lining which is secured to said rim by the bonding material, said lining being thereby flexibly attached to said rim for radial movement relative to the general surface of said rim.

3. A brake shoe comprising a web, an arcuate rim fixedly secured to said web, and a friction lining fixedly secured between the sides thereof to said rim, a plurality of lanced segments of said rim which are deflectable below the general surface of said rim, and a bonding agent which is coated only over the deflectable segments of said rim, said friction material being secured to said rim by attachment with the deflectable segments thereof through said bonding agent.

4. A brake shoe comprising a rim, a longitudinal strengthening web which is fastened to said rim midway between the sides thereof, a plurality of lanced segments of said rim which provide for bending of the surface thereof, a friction lining which is secured to only the lanced segments of the rim of said shoe whereby said lining is movable radially relatively to the general surface of said rim to prevent brake noise.

5. A brake shoe comprising an arcuate rim, a plurality of slices in said rim and which are formed parallel to each other and the edges of said rim, said plurality of slices forming rim segments which can move transversely to the surface of said rim, a bonding agent which is spread over only the movable segments of said rim, and a friction material which is attached to said rim solely by connection with said segments through said bonding material.

6. A brake shoe comprising an arcuate rim, a strengthening web secured to the undersurface of said rim, a plurality of spaced parallel slits in said rim on both sides of said web, said slits forming a plurality of segments in said rim which are slightly depressed below the general surface of said rim, and a friction lining attached to said rim by bonding the lining only to said segments, the unbonded portions of said lining and rim also being in full contact to assist in holding the lining to the rim.

References Cited in the file of this patent

UNITED STATES PATENTS

| | | |
|---|---|---|
| 2,037,455 | Bowen | Apr. 14, 1936 |
| 2,072,412 | Tarbox | Mar. 2, 1937 |
| 2,195,262 | Rasmussen | Mar. 26, 1940 |
| 2,294,329 | Ayers et al. | Aug. 25, 1942 |
| 2,361,307 | Merritt | Oct. 24, 1944 |
| 2,628,693 | Rodger | Feb. 17, 1953 |